(12) United States Patent
Jan (10) Patent No.: US 8,201,693 B2
(45) Date of Patent: Jun. 19, 2012

(54) APPARATUS AND METHOD FOR SEPARATING SOLIDS FROM A SOLIDS LADEN LIQUID

(75) Inventor: Helge Sorensen Jan, Vetre (NO)

(73) Assignee: National Oilwell Varco, L.P., Houston, TX (US)

( * ) Notice: Subject to any disclaimer, the term of this patent is extended or adjusted under 35 U.S.C. 154(b) by 289 days.

(21) Appl. No.: 12/227,462

(22) PCT Filed: May 26, 2006

(86) PCT No.: PCT/GB2006/050124
§ 371 (c)(1),
(2), (4) Date: Mar. 19, 2009

(87) PCT Pub. No.: WO2007/138240
PCT Pub. Date: Dec. 6, 2007

(65) Prior Publication Data
US 2009/0301939 A1 Dec. 10, 2009

(51) Int. Cl.
*B07B 1/18* (2006.01)
(52) U.S. Cl. ......... 209/293; 209/270; 209/379; 175/206
(58) Field of Classification Search ............ 209/17, 209/270, 284, 293, 294, 379–381; 175/66, 175/206; 210/384, 499
See application file for complete search history.

(56) References Cited

U.S. PATENT DOCUMENTS

| | | | |
|---|---|---|---|
| 2,082,513 A | 6/1937 | Roberts | 210/76 |
| 2,112,784 A | 3/1938 | McNitt | 99/105 |
| 2,312,620 A | 3/1943 | Bowman | |
| 2,418,529 A | 4/1947 | Stern | 51/309 |
| 2,653,521 A * | 9/1953 | Ahlfors | 209/270 |
| 2,942,731 A * | 6/1960 | Soldini | 209/293 |
| 3,012,674 A | 12/1961 | Hoppe | 209/401 |
| 3,302,720 A | 2/1967 | Brandon | 166/42 |
| 3,640,344 A | 2/1972 | Brandon | 166/307 |
| 3,796,299 A | 3/1974 | Musschoot | 198/220 |
| 3,855,380 A | 12/1974 | Gordon et al. | 264/97 |
| 3,874,733 A | 4/1975 | Poundstone et al. | 299/17 |
| 3,900,393 A | 8/1975 | Wilson | 209/399 |
| 3,993,146 A | 11/1976 | Poundstone et al. | 175/206 |

(Continued)

FOREIGN PATENT DOCUMENTS

DE 1243958 1/1965

(Continued)

OTHER PUBLICATIONS

U.S. Appl. No. 12/481,959 Final Office Action dated Oct. 27, 2010.

(Continued)

*Primary Examiner* — Joseph C Rodriguez
(74) *Attorney, Agent, or Firm* — Williams, Morgan & Amerson, P.C.

(57) ABSTRACT

An apparatus and method for separating solids from a solids laden drilling mud (14), the method comprising the steps of introducing solids laden drilling mud to a first side of a screen (13), the drilling mud passing through the screen (13) and screened drilling mud located the other side of the screen (13) characterized in that an oscillating tray (18) is located in the drilling mud and spaced from the screen, the oscillating tray imparting motion to the drilling mud to facilitate screening of said solids laden drilling mud in the screen (13).

31 Claims, 4 Drawing Sheets

U.S. PATENT DOCUMENTS

| | | | |
|---|---|---|---|
| 4,033,865 A | 7/1977 | Derrick, Jr. | 209/275 |
| 4,038,152 A | 7/1977 | Atkins | 201/2.5 |
| 4,192,743 A * | 3/1980 | Bastgen et al. | 210/712 |
| 4,222,988 A | 9/1980 | Barthel | 422/309 |
| 4,233,181 A | 11/1980 | Goller et al. | 252/425.3 |
| 4,350,591 A * | 9/1982 | Lee | 210/384 |
| 4,411,074 A | 10/1983 | Daly | 34/32 |
| 4,482,459 A | 11/1984 | Shiver | 210/639 |
| 4,526,687 A | 7/1985 | Nugent | 210/202 |
| 4,575,336 A | 3/1986 | Mudd et al. | 432/72 |
| 4,624,417 A | 11/1986 | Gangi | 241/17 |
| 4,639,258 A * | 1/1987 | Schellstede et al. | 95/260 |
| 4,650,687 A | 3/1987 | Willard et al. | 426/438 |
| 4,696,353 A * | 9/1987 | Elmquist et al. | 175/206 |
| 4,696,751 A | 9/1987 | Eifling | 210/780 |
| 4,729,548 A | 3/1988 | Sullins | 266/44 |
| 4,751,887 A | 6/1988 | Terry et al. | 110/246 |
| 4,770,711 A | 9/1988 | Deal, III et al. | 134/18 |
| 4,783,057 A | 11/1988 | Sullins | 266/44 |
| 4,791,002 A | 12/1988 | Baker et al. | 426/641 |
| 4,799,987 A | 1/1989 | Sullins | 156/425 |
| 4,809,791 A | 3/1989 | Hayatdavoudi | 175/40 |
| 4,832,853 A * | 5/1989 | Shiraki et al. | 210/781 |
| 4,889,733 A | 12/1989 | Willard et al. | 426/438 |
| 4,889,737 A | 12/1989 | Willard et al. | 426/550 |
| 4,895,665 A | 1/1990 | Colelli et al. | 210/710 |
| 4,895,731 A | 1/1990 | Baker et al. | 426/641 |
| 4,896,835 A * | 1/1990 | Fahrenholz | 241/74 |
| 4,915,452 A | 4/1990 | Dibble | 299/17 |
| 4,942,929 A | 7/1990 | Malachosky et al. | 175/66 |
| 5,053,082 A | 10/1991 | Flanigan et al. | 134/25.1 |
| 5,066,350 A | 11/1991 | Sullins | 156/187 |
| 5,080,721 A | 1/1992 | Flanigan et al. | 134/26 |
| 5,107,874 A | 4/1992 | Flanigan et al. | 134/60 |
| 5,109,933 A | 5/1992 | Jackson | 175/66 |
| 5,118,427 A | 6/1992 | Eichler | |
| 5,129,469 A | 7/1992 | Jackson | 175/66 |
| 5,145,256 A | 9/1992 | Wiemers et al. | 366/336 |
| 5,181,578 A | 1/1993 | Lawler | 175/424 |
| 5,190,645 A * | 3/1993 | Burgess | 210/144 |
| 5,200,372 A | 4/1993 | Kuroyama et al. | 501/96 |
| 5,221,008 A | 6/1993 | Derrick, Jr. et al. | 209/269 |
| 5,227,057 A | 7/1993 | Lundquist | 210/174 |
| 5,253,718 A | 10/1993 | Lawler | 175/20 |
| 5,314,058 A | 5/1994 | Graham | 198/753 |
| 5,337,966 A | 8/1994 | Francis et al. | 241/46.06 |
| 5,385,669 A | 1/1995 | Leone, Sr. | 210/488 |
| 5,488,104 A | 1/1996 | Schulz | 536/86 |
| 5,489,204 A | 2/1996 | Conwell et al. | 432/153 |
| 5,516,348 A | 5/1996 | Conwell et al. | 51/309 |
| 5,534,207 A | 7/1996 | Burrus | 264/150 |
| 5,547,479 A | 8/1996 | Conwell et al. | 51/309 |
| 5,566,889 A | 10/1996 | Preiss | 241/19 |
| 5,567,150 A | 10/1996 | Conwell et al. | 432/14 |
| 5,570,749 A | 11/1996 | Reed | 175/66 |
| 5,669,941 A | 9/1997 | Peterson | 51/295 |
| 5,732,828 A * | 3/1998 | Littlefield, Jr. | 209/365.1 |
| 5,791,494 A | 8/1998 | Meyer | 209/368 |
| 5,819,952 A | 10/1998 | Cook et al. | 209/400 |
| 5,868,125 A | 2/1999 | Maoujoud | 125/15 |
| 5,896,998 A | 4/1999 | Bjorklund et al. | 209/326 |
| 5,944,197 A | 8/1999 | Baltzer et al. | 209/400 |
| 5,971,307 A | 10/1999 | Davenport | 241/259.1 |
| 6,013,158 A | 1/2000 | Wootten | 202/99 |
| 6,045,070 A | 4/2000 | Davenport | 241/60 |
| 6,102,310 A | 8/2000 | Davenport | 241/21 |
| 6,138,834 A * | 10/2000 | Southall | 209/17 |
| 6,155,428 A * | 12/2000 | Bailey et al. | 209/315 |
| 6,170,580 B1 | 1/2001 | Reddoch | 175/66 |
| 6,179,071 B1 | 1/2001 | Dietzen | 175/66 |
| 6,223,906 B1 | 5/2001 | Williams | 210/400 |
| 6,234,250 B1 | 5/2001 | Green et al. | 166/250.03 |
| 6,279,471 B1 | 8/2001 | Reddoch | 100/37 |
| 6,283,302 B1 | 9/2001 | Schulte et al. | 209/399 |
| 6,315,813 B1 | 11/2001 | Morgan et al. | 95/23 |
| 6,333,700 B1 | 12/2001 | Thomeer et al. | 340/854.8 |
| 6,506,310 B2 | 1/2003 | Kulbeth | 210/780 |
| 6,763,605 B2 | 7/2004 | Reddoch | 34/58 |
| 6,783,088 B1 | 8/2004 | Gillis et al. | 241/19 |
| 6,793,814 B2 | 9/2004 | Fout et al. | 210/188 |
| 6,910,411 B2 | 6/2005 | Reddoch | 100/37 |
| 6,988,567 B2 | 1/2006 | Burnett et al. | 175/66 |
| 7,195,084 B2 | 3/2007 | Burnett et al. | 175/66 |
| 7,284,665 B2 * | 10/2007 | Fuchs | 209/270 |
| 7,303,079 B2 | 12/2007 | Reid-Robertson et al. | 209/405 |
| 7,316,321 B2 | 1/2008 | Robertson et al. | 209/400 |
| 7,373,996 B1 | 5/2008 | Martin et al. | 175/206 |
| 7,484,574 B2 | 2/2009 | Burnett et al. | 175/66 |
| 7,490,672 B2 | 2/2009 | Hollier | 166/357 |
| 7,497,954 B2 | 3/2009 | Ivan et al. | 210/703 |
| 7,503,406 B2 | 3/2009 | Seaton et al. | 175/66 |
| 7,506,702 B1 | 3/2009 | Patterson et al. | 175/66 |
| 7,507,344 B2 | 3/2009 | Mueller | 210/708 |
| 7,514,005 B2 | 4/2009 | Browne et al. | 210/708 |
| 7,514,011 B2 * | 4/2009 | Kulbeth | 210/780 |
| 7,581,569 B2 | 9/2009 | Beck | 139/425 R |
| 7,770,665 B2 | 8/2010 | Eia et al. | 175/66 |
| 2001/0032815 A1 | 10/2001 | Adams et al. | 210/388 |
| 2002/0000399 A1 | 1/2002 | Winkler et al. | 209/399 |
| 2002/0033278 A1 | 3/2002 | Reddoch | 175/57 |
| 2002/0134709 A1 | 9/2002 | Riddle | 209/238 |
| 2003/0224920 A1 | 12/2003 | Leung | 494/53 |
| 2004/0040746 A1 | 3/2004 | Niedermayr et al. | 175/38 |
| 2004/0051650 A1 | 3/2004 | Gonsoulin et al. | 340/853.1 |
| 2004/0156920 A1 | 8/2004 | Kane | 424/725 |
| 2004/0245155 A1 * | 12/2004 | Strong et al. | 209/405 |
| 2005/0236305 A1 | 10/2005 | Schulte, Jr. et al. | 209/403 |
| 2006/0034988 A1 | 2/2006 | Bresnahan et al. | 426/502 |
| 2008/0078704 A1 | 4/2008 | Carr et al. | 209/399 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0119570 A1 | 5/2010 | Potter et al. | 424/422 |

FOREIGN PATENT DOCUMENTS

| | | |
|---|---|---|
| DE | 4127929 A1 | 2/1993 |
| EP | 0 443 385 A3 | 8/1991 |
| FR | 2 611 559 | 9/1988 |
| FR | 2636669 A1 * | 3/1990 |
| GB | 1029001 | 5/1966 |
| GB | 2 030 482 A | 4/1980 |
| GB | 2 327 442 A | 1/1999 |
| JP | 55112761 | 8/1980 |
| JP | 59069268 | 4/1984 |
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |
| JP | 06063499 | 3/1994 |
| JP | 07304028 | 11/1995 |
| JP | 08039428 | 2/1996 |
| JP | 08270355 | 10/1996 |
| JP | 09109032 | 4/1997 |
| WO | WO98/10895 | 3/1998 |
| WO | WO 01/76720 A1 | 10/2001 |

OTHER PUBLICATIONS

U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/287,711 Office Action dated May 12, 2010.
U.S. Appl. No. 11/897,976 Final Office Action dated Sep. 1, 2010.
U.S. Appl. No. 11/897,976 Office Action dated Apr. 1, 2010.

U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Aug. 2, 2010.
U.S. Appl. No. 11/637,615 Office Action dated Mar. 2, 2010.
Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.

* cited by examiner

APPARATUS AND METHOD FOR SEPARATING SOLIDS FROM A SOLIDS LADEN LIQUID

The invention relates to an apparatus and method for separating solids from a solids laden liquid and particularly, but not exclusively an apparatus and method for separating solids from a solids laden drilling mud.

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic oil-based lubricants and it is normal therefore to recover and re-use the used drilling mud, but this requires inter alia the solids to be removed from the drilling mud. This is achieved by processing the drilling mud. The first part of the process is to separate the solids from the solids laden drilling mud. This is at least partly achieved with a vibratory separator, such as those shale shakers disclosed in U.S. Pat. No. 5,265,730, WO 96/33792 and WO 98/16328. Further processing equipment such as centrifuges and hydrocyclones may be used to further clean the mud of solids. The solids are covered in contaminates and residues. It is not uncommon to have 30 to 100 m³ of drilling fluid in circulation in a borehole.

The resultant solids, known herein as "drill cuttings" are processed to remove substantially all of the residues and contaminates from the solids. The solids can then be disposed of in a landfill site or by dumping at sea in the environment from which the solids came. Alternatively, the solids may be used as a material in the construction industry or have other industrial uses.

Shale shakers generally comprise an open bottomed basket having one open discharge end and a solid walled feed end. A number of rectangular screens are arranged over the open bottom of the basket. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces the solids to move along the screens towards the open discharge end. Drilling mud passes through the screens. The recovered drilling mud is received in the receptor for further processing and the solids pass over the discharge end of the basket into the ditch or skip.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948 and an example of a shale shaker suitable for receiving the pre-tensioned type screens is disclosed in GB-A-2,176,424.

An alternative apparatus for separating solids from solids laden drilling mud is disclosed in WO 01/76720 and NO 303323. The apparatus includes a rotatable drum, which rotates about its longitudinal axis. The drum has an input end and a discharge end and is provided with an internal concentric perforated drum. A concentric screw having a helical blade is arranged inside the perforate drum for moving the solids laden drilling mud from the input end to the discharge end as the drum rotates about its longitudinal axis. The solids laden drilling mud is pulled along towards the discharge end of the drum. However, the drilling mud passes through the perforate drum as it passes from the inlet end to the discharge end, so that only dry solids are left in the drum towards the discharge end. Thus there is a wet section at the inlet end of the drum and a dry section towards the discharge end of the drum. A suction device is located in the wet section to break down surface tensions in the boundary layer in the drilling mud to facilitate separation from the solids. Such a pressure fall across the screening cloth is controlled by an air lock.

A problem associated with shale shakers is that screens used therein tend to blind, especially when the solids are gummy, such as clay, or of a size close to the size of the mesh size of the screen. The latter type of blinding is known as near-sized particle blinding. A number of solutions have been proposed to tackle this problem, such as disclosed in GB-A-1,526,663 in which a screen assembly using two layers of screening material in a sandwich and allowing the layers of screening material to move independently to dislodge any near sized particles lodged in one of the screens. WO 01/76720 relating to the rotatable drum separator also discloses using air nozzles external to the perforate drum to provide positive pressure air through the perforate drum in the dry zone to ensure that the perforations do not clog with solids.

It is advantageous to use fine-meshed filters to filter very small particles, for example of a size in the range of 50-200μ or more, without the filtering device clogging up with the small particles. However, it is the fine-meshed filters in particular that are prone to such undesired clogging.

It is also advantageous to provide a separator which operates at low noise levels to comply with health and safety legislation. It is also advantageous to have a simple reliable separator to inhibit down-time for maintenance and repair.

It is preferable in certain circumstances to retain particles, for example of a particle size in the range of 50-60μ or larger, by means of a filter.

According to the present invention, there is provided a method for separating solids from a solids laden drilling mud, the method comprising the steps of introducing solids laden drilling mud to a first side of a screen, the drilling mud passing through the screen and screened drilling mud located the other side of the screen characterised in that an oscillating tray is located in the drilling mud and spaced from the screen, the oscillating tray imparting motion to the drilling mud to facilitate screening of said solids laden drilling mud in the screen. Advantageously, the screen does not oscillate. The screen is preferably static and advantageously static in relation to the oscillating tray. Preferably, the oscillatory motions are vibrations.

Vibrations are thus imparted from the tray to the screen via the drilling mud.

In order to expedite screening of solids laden drilling mud, energy is required to be imparted to the solids laden drilling at the juncture where the filtering takes place, i.e. where the solids laden drilling mud meets the screen. The inventors have found that by vibrating a tray in the fluid bed, energy in the form of vibrations can be imparted to the fluid bed, which is then imparted at the juncture where the filtering takes place, i.e. where the solids laden drilling mud meets the screen.

Preferably, the oscillating tray is located beneath the screen. Advantageously, the tray is shaped to contain drilling mud. Preferably, the tray encompasses at least a part of the screen, wherein drilling mud is retained in the oscillating tray and at least part of the screen is immersed therein. By containing the drilling mud about the screen, the vibrational movement of the tray relative to the screen creates a pumping effect transversally to the wall of the screen, which helps to wash away the fine particles from the small openings in the screen and suck the drilling mud through the screen. Thus a washing, sucking and vibrating effect is observed.

Advantageously, the oscillating tray is located in the screened drilling mud and the motion is imparted from the vibrating tray to the screened drilling mud. Preferably, screened drilling mud is allowed to flow over the tray and into a sump.

Preferably, the oscillating tray is connected to an arm which is pivotally mounted on a pivot, the method further comprising the step of oscillating the tray about the pivot. Preferably, the pivot is a universal joint or a pin and hole pivot. Advantageously, the tray oscillates in horizontal and/or vertical plane(s).

Preferably, the screen is washed more or less continuously with a fluid jet. The fluid jet facilitates removal of solids blinding the screen.

Advantageously, wherein the screen is curved.

Preferably, the screen is in the form of a cylinder. Advantageously, the method further comprises the step of rotating the cylinder. Preferably, the cylinder rotates such that at any time a lower part of one end of the cylinder has drilling mud on both sides of the screen.

The present invention also provides an apparatus for separating solids from a solids laden drilling fluid, the apparatus comprising a screen, a tray and an oscillatory mechanism for imparting oscillations to the tray, such that, in use, the tray imparts oscillations to drilling mud to impart motions to solids laden drilling mud to be screened by the screen.

Preferably, the screen does not oscillate in concert with the tray. Advantageously, the tray is located beneath the screen. Preferably, the tray is shaped to contain drilling mud. Advantageously, the tray comprises at least one side over which drilling mud may flow. The screened drilling mud flows out over the edge of the tray and under the screen. Thus a weir is created. Preferably, the tray encompasses at least a part of the screen, wherein drilling mud is retained in the tray and at least part of the screen is immersed therein.

Advantageously, the screen is curved. Preferably, the screen is cylindrical. Preferably, the tray has a width substantially corresponding to the radius of the drum. Preferably, the apparatus further comprises an axle for facilitating rotation of the cylindrical screen. Advantageously, a screw is provided for moving solids laden drilling mud along the cylindrical screen.

Advantageously, the screen comprises a wet zone in which drilling mud lies inside the cylindrical screen and a dry zone in which no or only a little drilling mud lies inside the cylindrical screen, in use. Preferably, the tray is located in the wet zone.

Advantageously, the apparatus further comprises a pivot, the tray pivotally mounted to the pivot. Preferably, the tray is pivoted about a horizontal axis and advantageously on the end of an arm. Preferably, the axis lies at a distance from the nearest end of the tray. Advantageously, equal to the length of the screen, such that the oscillations along the length of the tray reduce as the expected pool depth of drilling mud reduces.

Preferably, nozzles are arranged for washing the screen.

Consequently, with the solution according to the invention it is the fluid and not the screen that is supplied with energy through the vibration.

As the screen itself is not subjected to mechanically induced vibrations, the sizing and construction, of the screen for example, could be simplified.

For a better understanding of the present invention, reference will now be made, by way of example, to the accompanying drawings, in which.

Figure 1:
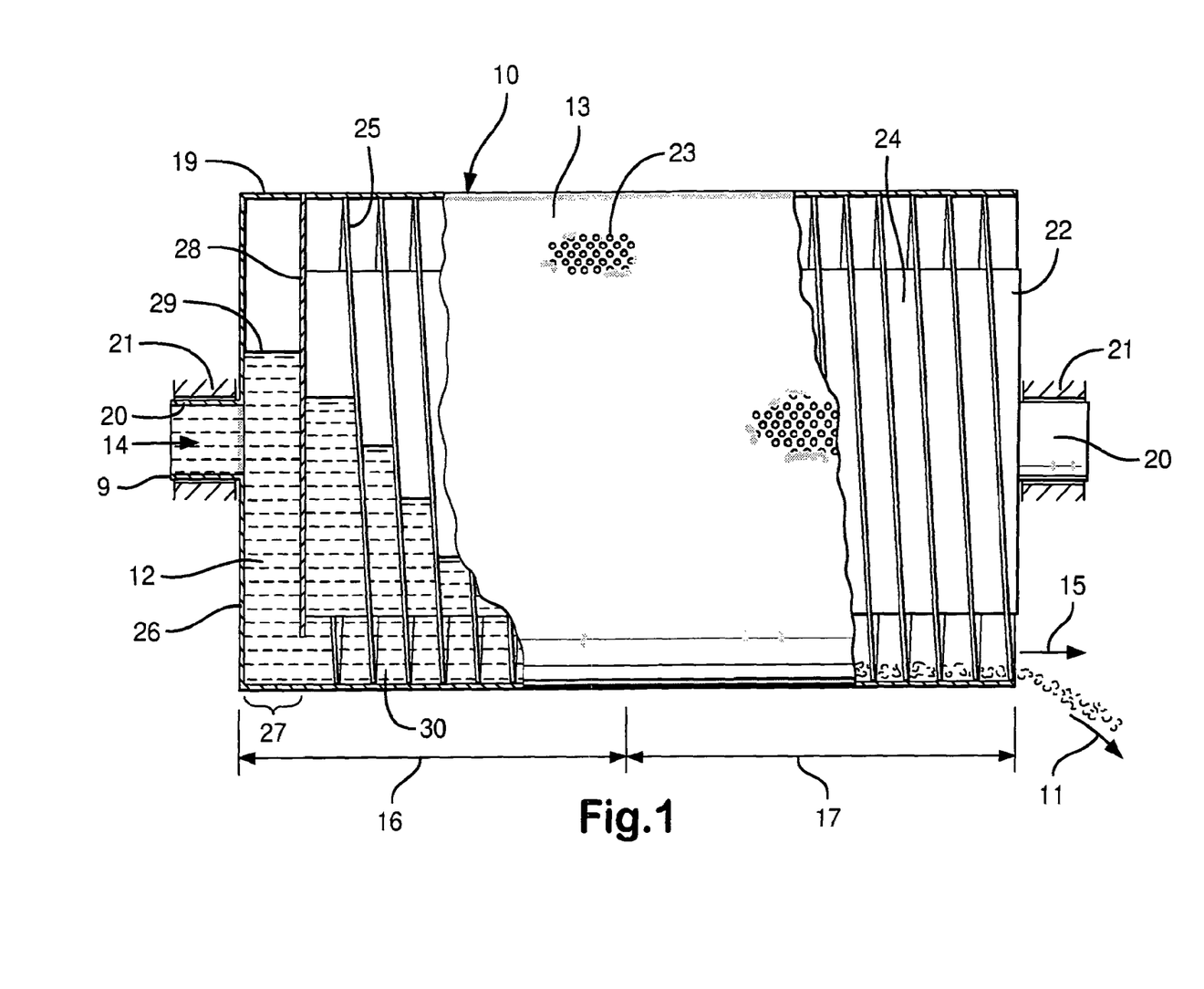
FIG. 1 shows a known apparatus for separating solids from solids laden drilling mud, as disclosed in WO 01/76720 A1.

FIG. 1 shows a known apparatus for separating solids from a solids laden drilling mud, generally identified by reference numeral 10. This apparatus is disclosed in PCT Publication Number WO 01/76720 A1, herein incorporated for all purposes. The apparatus 10 consists of a rotatable drum 19, which is supported by means of an axle 20 at either end. The axles 20 are rotatably supported in associated bearings 21. Inside the rotatable drum 19 is arranged a concentric screw 22 which rotates with the drum 19. The rotatable drum 19 has a cylindrical member 13 provided with a great number of openings or perforations 23. The screw 22 consists of a mandrel 24 and a helically shaped vane 25 thereabout.

The drum 19 has a fluid-tight front wall 26. Inside the drum 19 is a wall 28 defining a fluid introduction zone 12 and an opening into a fluid passage defined by the mandrel 24 and the cylindrical member 13.

As the drum 19 rotates, the solids laden drilling fluid will be screwed forwards from inlet 9 towards the outlet 15 of the drum 19 by means of the vanes 25, while at the same time filtering the solids laden drilling mud 12. Filtered drilling mud 12a will flow out through the perforations 23, inter alia by means of gravity. Thereby, the fluid level is reduced successively in each successive chamber 30, until substantially all the drilling fluid 12a has run out and only solids are left on the cylindrical member 13. The solids 11 are still being moved towards the outlet 15 by rotation of the drum 19. Thus apparatus 10 provides with a first wet zone 16 and a successive dry zone 17. The size of these zones depends on many factors, including inter alia the rate and quantity of solids laden drilling mud introduced; the character of the solids in the solids laden drilling mud; and the character of the drilling mud.

Figure 2:
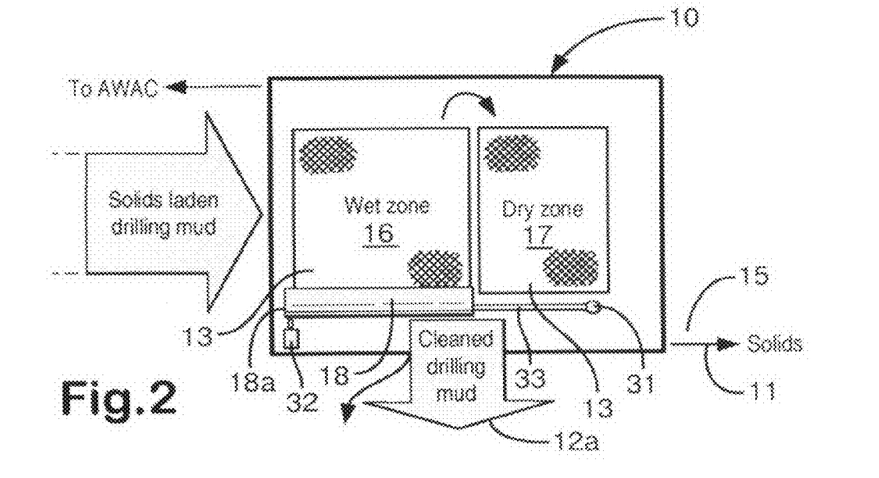
FIG. 2 is a flow chart showing flow of solids laden drilling mud through an apparatus in accordance with the present invention.
Figure 3:
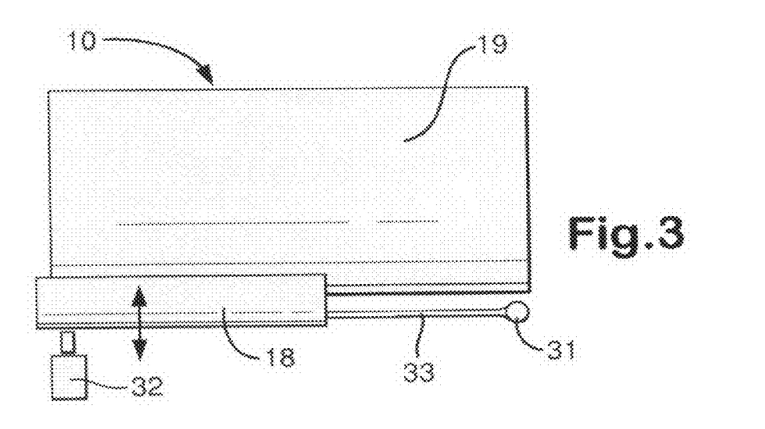
FIG. 3 is a schematic diagram of a side view of an apparatus in accordance with the present invention.
Figure 4:
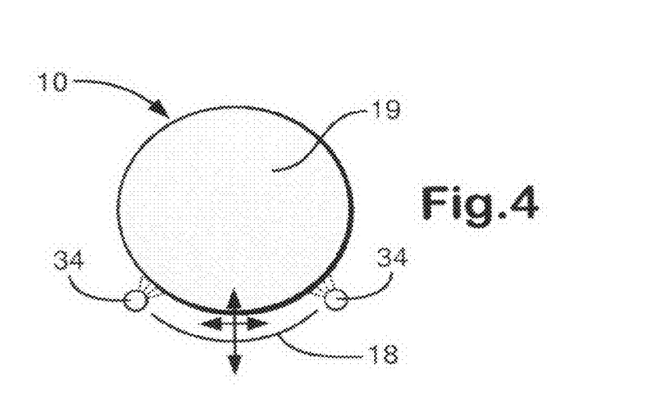
FIG. 4 is a schematic diagram of an end view of the apparatus shown in FIG. 3.

Referring now to FIGS. 2, 3 and 4, there is shown diagrammatically, an apparatus similar to the one shown in FIG. 1, generally identified by reference numeral 10. Like numerals are used to refer to like parts shown in FIG. 1. Solids laden drilling mud is conveyed from a borehole into the inlet 9 of the apparatus 10.

The solids laden drilling mud 14 flows into the rotating drum 19 and is conveyed along the passage defined by the mandrel 24 and a cylindrical screen 13. The cylindrical screen 13 may be formed, for example, of fine-meshed net or cloth, which is supported stretched over a perforate cylinder.

The apparatus 10 further comprises a vibrating tray 18 filled with drilling mud, which is located below at least the wet zone 16. A number of nozzles 34 are also placed on either side of the rotating drum 19, in line and just above the tray 18. The line of nozzles 34 extends at least along the wet zone 16 of the drum 19. Correspondingly, the tray 18 may advantageously, be as long as the expected extent of the wet zone 16 of the drum 19, or may be longer or may be the full length of the drum 19.

The tray 18, which is located underneath the drum 19, is pivotally suspended at one end about a horizontal axis 31 extending transversally to the longitudinal axis of the drum 19. Alternatively, the axis 31 may be in the form of a universal joint allowing oscillating motion of the tray 18.

The apparatus 10 has a drum 19 rotating about the longitudinal axis and is provided with axles 20, which rotate in bearings 21. During rotation the solids laden drilling mud 14 is carried along the longitudinal axis of the drum 19 from the inlet 9 through the interior of the drum 19 and along the cylindrical screen 13. On its way the screened drilling mud 12a flows through the cylindrical screen 13 by means of gravity and/or is pumped out, whereas the solids are moved in an axial direction through the drum 19 towards the outlet 15. As shown in FIG. 2, there is thus established a wet zone 16 and a dry zone 17 in the drum 19. Essentially all screened drilling mud 12a having flown out of the drum 19 and/or been pumped out through the cylindrical screen 13 before the cuttings leave the drum 19 at the opposite end of the inlet 9. The solids 11 are then carried, in a known manner, to an appropriate landfill site (not shown), or conveyed into cuttings boxes or other such receptacles for further use. The screened drilling mud 12a is re-circulated in a known manner back into the borehole or further processed before being re-circulated. The drum 19 is equipped with a screw device 22 arranged within the drum 19 to move the solids and drilling mud forwards in a controlled manner towards the outlet for cuttings (not shown) of the apparatus 10.

At the inlet end of the tray 18 is installed a device 32 (ref. FIG. 3) for imparting a vibrational movement to the tray 18 about fixed axle 31.

The drum 19 is 2.5 metres long and 1.5 metres in diameter.

As the tray 18 moves upwards towards the cylindrical screen 13, fluid is forced up through the cylindrical screen 13, which help loosen particles on the internal surface of the cylindrical screen 13. The upward movement thus forces some drilling mud through the screen cloth, so that the cloth is "opened", while drilling mud is simultaneously forced to sides 18a of the tray 18, over and out from the space between the sides 18a and cylindrical screen 13 and into a sump 35.

As the tray 18 moves away from the cylindrical screen 13, a suction effect is created, helping to suck the drilling mud out through the cylindrical screen 13. The tray 18 has a length at least substantially corresponding to the length of the wet zone 16 within the drum 19. It is not preferred for the tray 18 to have an extent which extends below the dry zone 17. However, the method will work if the tray extends into the dry zone 17, but it will only be effective within the wet zone 16. For this reason it may be desirable for the tray 18 to be suspended on one or more arms 33 extending between the tray 18 and the axle 31. As the tray 18 moves downwards, fluid will consequently be sucked out of the cylindrical screen 13 while some fluid will simultaneously flow through by means of gravity further into the dry zone 17. Thereby the volume between the tray 18 and cylindrical screen 13 is filled, so that the tray 18 becomes filled with fluid and will be ready for new upward movement.

Screened drilling mud 12a, flows down through the cylindrical screen 13 and from over the top of the sides 18a of the tray 18 and is collected in a sump 35 having a sloping bottom plate 36 for further pumping out/draining through a pipe system with an associated pump (not shown).

Figure 5:
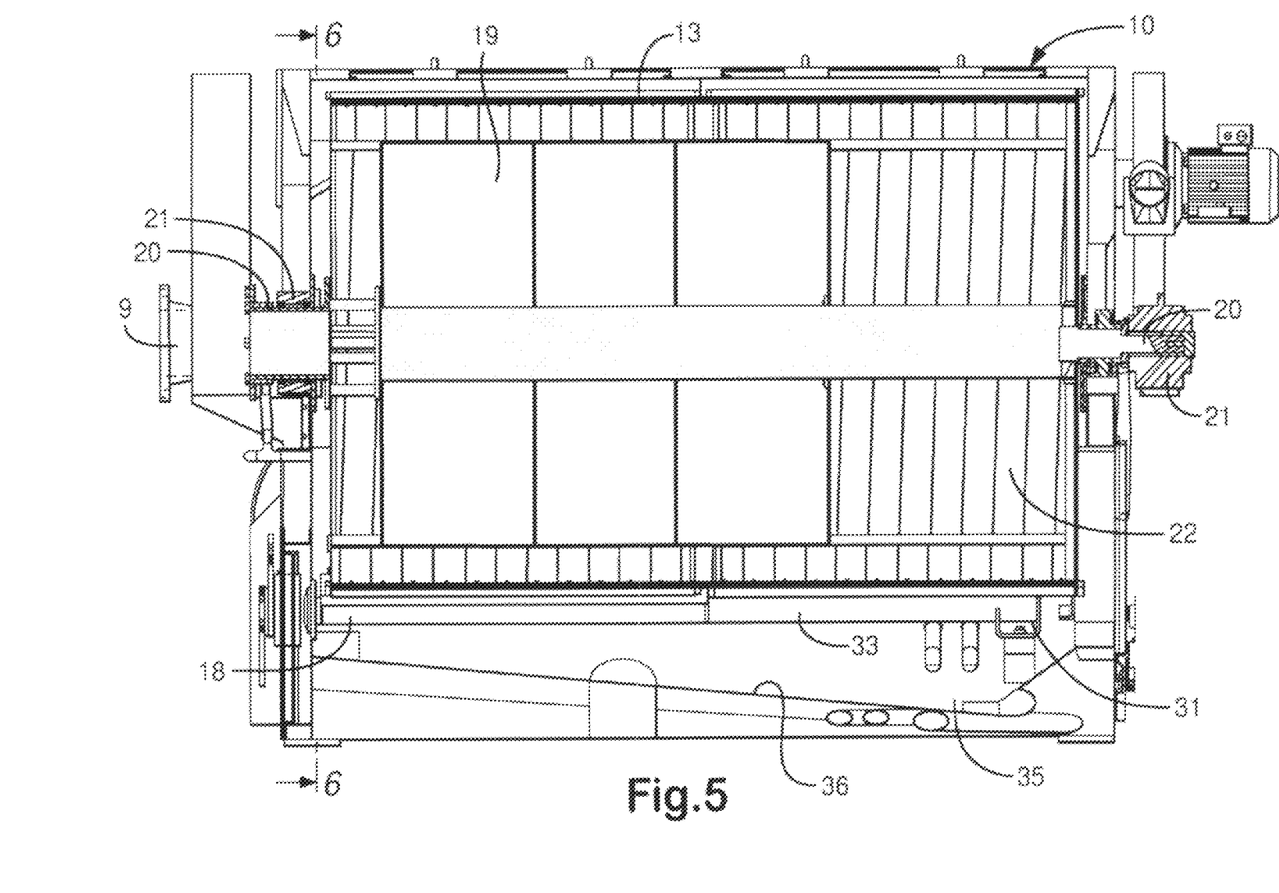
FIG. 5 shows a vertical section through an embodiment of an apparatus in accordance with the present invention.

As shown in FIG. 5, the drum 19 and tray 18 are built into a housing 37 enclosing the drum 19 and the tray 18. In this connection it should be noted that the apparatus 10 is equipped with the necessary motors, pipe system, bonnet openings to allow easy access to the drum 19, sump 35, and collecting tanks (not shown) for the solids, and similar which is obvious to a person skilled in the art, without being described in further detail.

Figure 6:
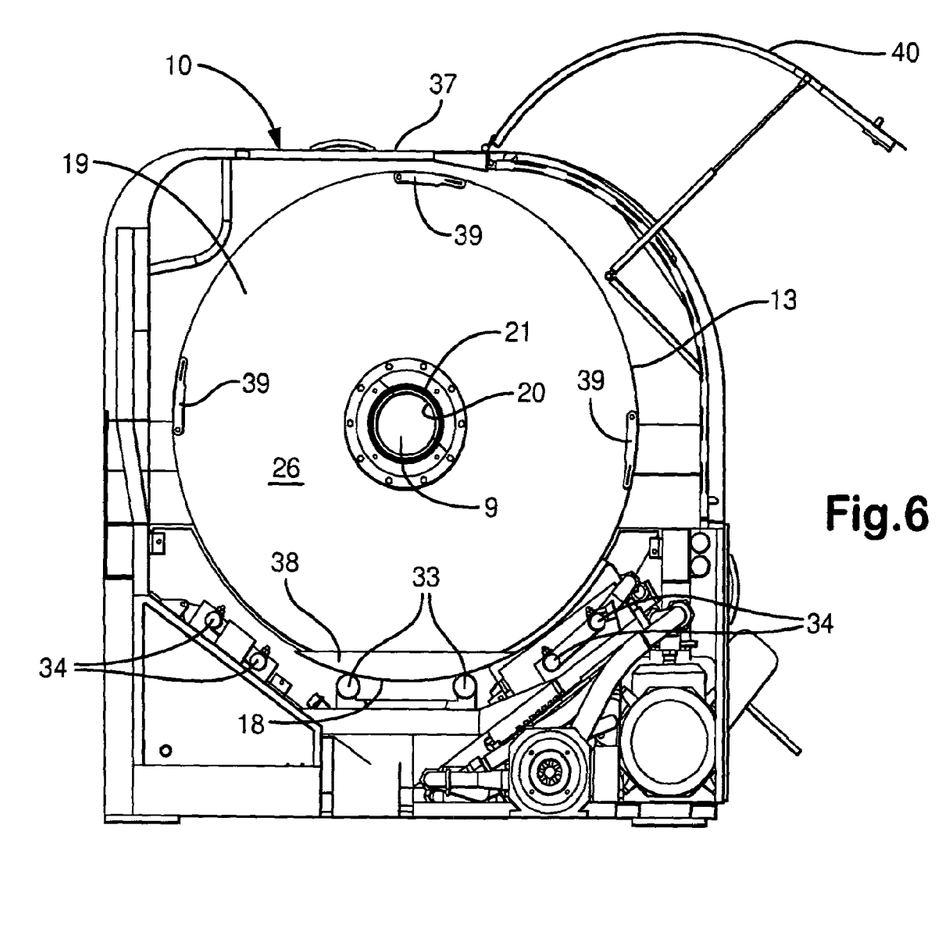
FIG. 6 shows a vertical section of the embodiment shown in FIG. 5, viewed along the line 6-6 in FIG. 5.

FIG. 6 shows a vertical section, taken along the line 6-6 of FIG. 5. The apparatus 10, which is generally similar to the apparatus shown schematically in FIGS. 2 to 4) is built into a housing 37 completely enclosing the apparatus 10 and functioning both as a noise insulator and to inhibit escape of drilling mud and/or solids form the apparatus 10. The enclosure may also be connected to an HVAC system to inhibit fumes and pollution from collecting about the apparatus. The apparatus 10 comprises a drum 19, which rotates about the axle 20 supported in bearings 21. The axle 20 shown is formed with a central opening 14 for the supply of cuttings and drilling mud to be treated in the separator 10. At its lower end is arranged a tray 18, which is suspended on two arms 33, which are suspended at the opposite end on a bearing (not shown). At the input end of the drum 19 the tray 18 is equipped with a front termination 38 in the form of a vertical plate. The termination 38 shown is located in front of front wall 26 of the drum 19.

Just above the tray 18 there are arranged a number of nozzles 34 spraying fluid in towards the outside of the drum 19 which during operation help to free any solid that may have lodged in the cylindrical screen 13. For reasons of clarity, supply pipes for such spraying fluid are not shown. According to the embodiment shown, two rows of nozzles 34 are used on either side of the drum. The nozzles extend in the longitudinal direction of the drum 19, at least up to the end of the wet zone of the drum and/or to the rear end of the tray 18.

The cylindrical screen 13 preferably comprises one or more layers of fine-mesh cloths (not shown), which are tightened on the surface of a perforate cylindrical member. Each cloth covers a sector of 90°, so that four cloths cover the entire circumference of the drum 19. The cloth is flexible and at its one end each cloth is provided with a hook-like means to be hung on a suitable holding means, whereas the opposite end is equipped with corresponding holding means which cooperate with a tightening means 39 for the tightening of the cloth, so that it is stretched round the surface sector of the drum 19. The drum is provided with four such tightening means, three of which are visible in the figure.

The housing 37 of the fluid separator 10 is provided with one or more inspection and/or service hatches 40, one of which is shown in the open position.

The apparatus 10 operates in the following way:

Fluid, usually, but not necessarily, clean drilling mud is introduced into the tray 18, while, at the same time, the drum 19 is rotated and solids laden drilling mud 14 is introduced into the apparatus 10 through inlet 9. Clean drilling mud is also sprayed towards and on to the outside of the part of the cylindrical screen 13, that extends through the wet zone 16. The clean drilling mud is sprayed through nozzles 34 arranged on either side of the drum 19 at the lower part thereof.

As the solids laden drilling mud hits the inside of the drum 19, the drilling mud will flow out of the drum 19 through the perforate cylinder 13 inter alia by means of gravity and/or be sucked out by the downward movement of the tray 18, whereas the cuttings are retained in the drum 19 and moved in the axial direction by means of, for example, the screw 22 arranged inside the drum 19.

As the solids are moved axially in the drum 19 towards the outlet, all the drilling mud will gradually run out of the apparatus 10, and the solids will gradually dry as they progress along the dry zone 17. It should be pointed out, however, that the solids are still wet, sometimes with a pasty consistency.

The tray 18 with clean drilling mud oscillates all the time in preferably an oval or circular movement up and down, which creates a pumping effect, loosening particles that may have stuck internally on the perforations 23 in the cylinder 13 (and any screen cloth), in the upward movement, and drawing drilling mud out of the drum 19 through the perforations 23 (and any screen cloth) in the cylinder 13 in the downward movement.

Drilling mud flows down into the tray 18 and then out of the tray 18 into the sump 35 for possible further recirculation to the well.

At the same time as the tray 18 is oscillating up and down, the cylindrical screen 13 is washed from the outside in the opposite direction to the flow direction of the drilling fluid by means of nozzles 34 which may be arranged on one or both sides of the tray 18, immediately to the sides thereof.

The solids are collected in a pit, container, or conveyor or a suitable means of disposal of some other form.

In the exemplary embodiment shown the nozzles 34 are placed at the front and rear of the tray 18, viewed in the direction of rotation of the drum 19. Thereby the perforations 23 in the cylindrical screen 13 is washed from the outside before the washed part comes into contact with the fluid in the tray 18 and is subjected to vibrations from the movement in the fluid masses. It should be noted, however, that nozzles 34 might be placed along all or parts of the free surface of the drum 19 without departing from the scope of the invention. Alternatively, the fluid separator may be formed without any external nozzles.

According to the exemplary embodiment described above there is an excess of fluid on the outside, so that at all times there will be sufficient fluid to bring about the vibratory effect created by the tray 18 and the movement of the drilling mud. In consequence of this, the tray 18 is equipped with delimitations (a wall) at its free end, that is the end which is located closest to the inlet for cuttings and fluid, whereas the opposite end is not necessarily formed with any transversal termination, whereby the fluid is freely permitted to run out of the tray at the ends of the tray. It should be noted that the tray may take any form, as long as the tray is in contact with drilling mud which also flows across the screen part of the However, at least at the end, which lies at the inlet for drilling fluid with cuttings, the tray 18 may, if desired, be provided with delimitations, which restrict the outflow of fluid at said end(s).

The apparatus 10 in accordance with the present invention may, advantageously, be completely built-in in a closed housing 37 with openings for, for example, ensuring access to the apparatus 10 for inspection, maintenance and replacement of filtering devices 13.

The mechanism 32 for moving or vibrating the tray 18 may be of any suitable type, such as a motor driving arms with eccentric weights to impart the desired vibration to the tray 18 through an eccentric motion.

The invention is not limited exclusively to the use in connection with the separation of solids consisting of fine particles, for example down to 50-60μ, but can also function for the separation of solids consisting of larger particle sizes.

The invention claimed is:

1. A method for separating solids from a mixture of drilling mud and solids, the method comprising introducing the mixture of drilling mud and solids to a first side of a screen having a first length, wherein the mixture is introduced to a wet zone located at a first end of the screen, passing drilling mud from the mixture through the screen, wherein said drilling mud passes from the first side of the screen to a second side of the screen, and said separated solids substantially remain on the first side of the screen, and positioning a tray having a second length that is less than the first length proximate to the wet zone and spaced apart from the second side of the screen, wherein the length of the tray substantially defines a length of the wet zone, and oscillating the tray to impart motion to the mixture to facilitate screening thereof, wherein oscillating the tray comprises moving the tray relative to the screen.

2. The method of claim 1, further comprising positioning the tray at least partially below the wet zone of the screen.

3. The method of claim 1 further comprising containing drilling mud in the tray.

4. The method of claim 1, further comprising configuring the tray to encompass at least a part of the wet zone of the screen, to retain drilling mud in the tray and to immerse at least part of the wet zone of the screen in said drilling mud retained in the tray.

5. The method of claim 1, further comprising locating the tray in screened drilling mud that has passed through the wet zone of the screen and imparting motion to the screened drilling mud with the tray.

6. The method of claim 5 further comprising flowing screened drilling mud over the tray and into a sump.

7. The method of claim 1, further comprising moving the screen relative to the tray.

8. The method of claim 1, further comprising connecting the tray to an arm which is pivotally mounted on a pivot and oscillating the tray about the pivot.

9. The method of claim 1 further comprising oscillating the tray in a horizontal plane.

10. The method of claim 1 further comprising oscillating the tray in a vertical plane.

11. The method of claim 1 further comprising washing the screen with a fluid jet.

12. The method of claim 1 wherein introducing the mixture to the first side of the screen comprises intruding the mixture to a first side of a curved screen.

13. The method of claim 1 wherein introducing the mixture to the first side of the screen comprises intruding the mixture to a first side of a cylindrical screen.

14. The method of claim 13 further comprising rotating the cylindrical screen.

15. The method of claim 14, further comprising rotating the screen such that at any time a lower part of the wet zone of the screen has drilling mud on both sides.

16. The method claim 1, further comprising producing oscillatory motions with the tray, the oscillatory motions comprising vibrations.

17. The method of claim 1, further comprising discharging said separated solids from the first side of the screen, wherein the said separated solids are discharged from a dry zone located at a second end of the screen opposite of the first end.

18. An apparatus for separating solids from a mixture, the mixture comprising drilling fluid and solids, the apparatus comprising:
 a screen comprising an inlet end, a first side and a second side, wherein the screen is adapted to receive the mixture to be separated on said first side in a wet zone located proximate to said inlet end, to substantially retain separated solids on said first side, and to discharge drilling fluid from said second side;
 a tray positioned proximate to the wet zone and spaced apart from the second side of the screen, wherein a length of the tray is less than a length of the screen, and wherein the length of the tray substantially defines a length of the wet zone;
 an oscillatory mechanism connected to the tray, wherein said oscillatory mechanism is adapted to move the tray relative to the screen so as to impart oscillations to drilling fluid adjacent the screen.

19. The apparatus of claim 18 wherein the screen is adapted to move relative to the tray.

20. The apparatus of claim 18 wherein the tray is located at least partially below the wet zone of the screen.

21. The apparatus of claim 18 wherein the tray is shaped to contain drilling fluid.

22. The apparatus of claim 18 wherein the tray comprises at least one side over which drilling fluid may flow.

23. The apparatus of claim 18 wherein the tray encompasses at least a part of the wet zone of the screen, wherein drilling fluid is retainable in the tray and at least part of the wet zone of the screen is immersible therein.

24. The apparatus of claim 18 wherein the screen is curved.

25. The apparatus of claim 18 wherein the screen is cylindrical.

26. The apparatus of claim 25 further comprising an axle connected to the screen, wherein the axle is adapted for rotating the screen.

27. The apparatus of claim 26 further comprising a screw for moving at least a portion of the mixture along the screen from the inlet end to an outlet end that is located at an opposite end of the screen from the inlet end.

28. The apparatus of claim 25, further comprising
 an outlet end that is located at an opposite end of the screen from the inlet end, and a dry zone on the first side of the screen wherein a reduced amount of drilling mud remains on the first side of the screen, and wherein the dry zone is located proximate to the outlet end.

29. The apparatus of claim 18 further comprising a pivot, the tray pivotally mounted to the pivot.

30. The apparatus of claim 18 further comprising nozzles for washing the screen.

31. The apparatus of claim 18 wherein the tray is adapted to create a pumping effect with respect to the screen.

* * * * *

UNITED STATES PATENT AND TRADEMARK OFFICE
CERTIFICATE OF CORRECTION

PATENT NO.         : 8,201,693 B2                                   Page 1 of 1
APPLICATION NO.    : 12/227462
DATED              : June 19, 2012
INVENTOR(S)        : Jan Helge Sorensen It is certified that error appears in the above-identified patent and that said Letters Patent is hereby corrected as shown below:

Title page, item [75] inventor: change "Helge Soresen Jan" to -- Jan Helge Sorensen --.

Signed and Sealed this
Fourteenth Day of August, 2012

David J. Kappos
*Director of the United States Patent and Trademark Office*